US012233644B2

(12) United States Patent
Castro Soriano et al.

(10) Patent No.: US 12,233,644 B2
(45) Date of Patent: Feb. 25, 2025

(54) DETERMINING ALIGNMENT OF A PRINTHEAD

(71) Applicant: Hewlett-Packard Development Company, L.P., Spring, TX (US)

(72) Inventors: Javier Castro Soriano, Sant Cugat del Valles (ES); Nestor Luid Pinol, Sant Cugat del Valles (ES); Carles Carmona Calpe, Sant Cugat del Valles (ES); David Vendrell Tornero, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 18/246,158

(22) PCT Filed: Sep. 22, 2020

(86) PCT No.: PCT/US2020/052006
§ 371 (c)(1),
(2) Date: Mar. 21, 2023

(87) PCT Pub. No.: WO2022/066143
PCT Pub. Date: Mar. 31, 2022

(65) Prior Publication Data

US 2023/0356522 A1 Nov. 9, 2023

(51) Int. Cl.
*B41J 2/045* (2006.01)
*B41J 25/308* (2006.01)

(52) U.S. Cl.
CPC ....... *B41J 2/04505* (2013.01); *B41J 2/04503* (2013.01); *B41J 25/308* (2013.01)

(58) Field of Classification Search
CPC .. B41J 2/04505; B41J 2/04503; B41J 25/308; B41J 2/04586; B41J 2/2135; B41J 19/145; B41J 2/04556; B41J 25/304
See application file for complete search history.

(56) References Cited

U.S. PATENT DOCUMENTS

| | | | |
|---|---|---|---|
| 6,565,272 | B2 | 5/2003 | Kelley et al. |
| 6,626,511 | B2 | 9/2003 | Riou |
| 6,775,022 | B2 | 8/2004 | Noyes et al. |
| 7,445,302 | B2 | 11/2008 | Edwards et al. |
| 7,588,302 | B2 | 9/2009 | Bastani et al. |
| 9,676,180 | B2 | 6/2017 | Gracia Verdugo et al. |
| 2004/0080555 | A1 | 4/2004 | Otsuki et al. |
| 2015/0097896 | A1 | 4/2015 | Kawafuji |
| 2016/0059601 | A1 | 3/2016 | Arimori et al. |
| 2019/0270306 | A1 | 9/2019 | Uroz Soria et al. |

FOREIGN PATENT DOCUMENTS

| | | | | |
|---|---|---|---|---|
| JP | 5009952 B2 | | 8/2012 | |
| WO | 2011/079288 A2 | | 6/2011 | |
| WO | 2019/089036 A1 | | 5/2019 | |
| WO | WO2022203691 | * | 9/2022 | ............ B41J 2/2135 |

* cited by examiner

*Primary Examiner* — Kristal Feggins
(74) *Attorney, Agent, or Firm* — Jordan IP Law, LLC

(57) ABSTRACT

A method is described in which a difference in height is determined between a current position and a calibration position of a printhead of a printer. An alignment value for the printhead is then determined based on the difference.

14 Claims, 3 Drawing Sheets

(a)

(b)

DETERMINING ALIGNMENT OF A PRINTHEAD

BACKGROUND

Misalignment of a printhead of a printer may influence the quality of the printed image. For example, in bidirectional printing, drops of a printing fluid are fired from the printhead during both forward and reverse travel. Misalignment of the printhead may therefore result in a mismatch between drops fired during forward travel and drops fired during reverse travel.

DETAILED DESCRIPTION

Figure 1:
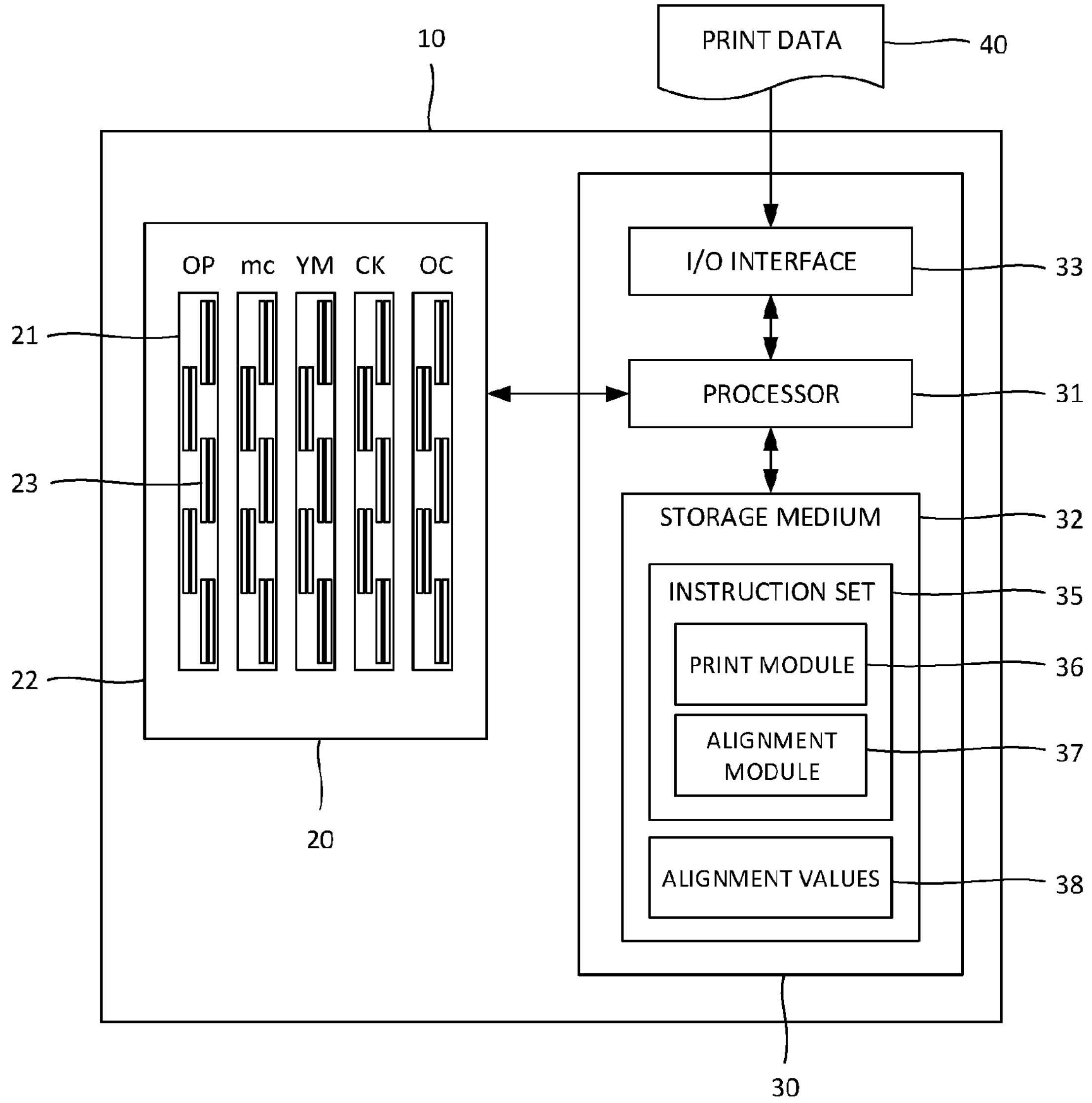
FIG. 1 shows an example printer.

FIG. 1 shows an example printer 10 that comprises a carriage assembly 20 and a control unit 30.

The carriage assembly 20 comprises a plurality of printheads 21 carried by a carriage 22, A drive assembly (not shown) moves the carriage assembly 20 along a scan axis in response to drive signals from the control unit 30.

Each of the printheads 21 comprises a plurality of dies 23, with each die comprising a plurality of nozzles through which drops of a printing fluid may be fired. The printheads 21 are fluidly coupled to fluid reservoirs (not shown), which supply printing fluids to the printheads. Each printing fluid may be a colorant or a non-colorant, such as a pre-treatment (e.g. fixer/optimizer) or post-treatment (e.g. overcoat) fluid. In the illustrated example, the printer 10 comprises five printheads 21 that are supplied with eight different printing fluids: cyan (C), magenta (M), yellow (Y), black (K), light cyan (c), light magenta (m), optimizer (OP) and overcoat (OC).

The control unit 30 comprises a processor 31, a storage medium 32, and an input/output interface 33. The processor 31 is responsible for controlling the operation of the printer 30 and executes an instruction set 35 stored in the storage medium 32. The instruction set 35 comprises instructions, which when executed by the processor 31, implement a print module 36 and an alignment module 37. In addition to the instruction set 35, the storage medium 32 stores a plurality of calibration alignment values 38.

In response to print data 40 received at the input/output interface 33, the print module 36 generates firing signals, which cause nozzles of the printheads 21 to fire. When a nozzle of a printhead 21 is fired, the trajectory of the resulting drop of printing fluid has a velocity component parallel to the scan axis, i.e. the axis along which the carriage assembly 20 moves back and forth over a print medium. This velocity component arises because the printhead 21 is not static when the nozzle is fired but is instead moving along the scan axis. As a consequence, there is a difference between the position at which a nozzle is fired and the position at which the resulting drop of printing fluid impacts the print medium. In bidirectional printing, this difference, if not corrected for, may result in misalignment between drops fired during forward travel and drops fired during reverse travel.

The print module 36 therefore applies an offset to the positions or times at which the nozzles of a printhead 21 are fired such that drops fired during forward and reverse travel are aligned. The offset may be applied during just one of forward or reverse travel. For example, during forward travel the nozzles may be fired when the printhead is at position x, and during reverse travel the nozzles may be fired when the printhead is at position $x+\Delta x$, where $\Delta x$ is the offset. Alternatively, the offset may be applied partly during forward travel and partly during reverse travel. So, for example, during forward travel the nozzles may be fired when the printhead is at position $x-\Delta x/2$, and during reverse travel the nozzle may be fired when the printhead is at position $x+\Delta x/2$.

The storage medium 32 stores a calibration alignment value 38 for each of the printheads. The print module then uses the calibration alignment value to define the offset for the respective printhead. In one example, the alignment value may take on a value of between 0 to 20. Each calibration alignment value may have a default value of 10 which, for a nominal printer, may result in alignment during bidirectional printing. However, tolerances in the printer (e.g. tolerances in the speed of the carriage assembly 20, or tolerances in the position of a printhead 21 within the carriage 22) may mean that a printhead is not perfectly aligned when using an alignment value of 10.

The printer 10 may therefore be calibrated in order to determine the calibration alignment value 38 for each of the printheads 21. Calibration may comprise printing a test pattern onto a print medium and then determining the calibration alignment value 38 for a printhead 21 based on the alignment of features within the test pattern. In one example, the test pattern may comprise pairs of lines for each of the printheads. Each pair of lines is printed using a different alignment value. So, for example, the test pattern may comprise twenty one pairs of lines for each printhead, with each pair corresponding to an alignment value of between 0 and 20. For each pair of lines, one of the lines is printed during forward travel and the other is printed during reverse travel of the printhead. The calibration alignment value for a printhead may then be determined by identifying the pair of lines for which the two lines appear to be most closely aligned.

During subsequent use of the printer 10, the height of the printheads 21 (i.e. the spacing or distance between the printheads and the print medium) may change. For example, the printheads 21 may be raised in order to avoid collision with relatively thick print media or media that may deform during printing. In another example, the printheads 21 may be raised in order to prevent collision with printer accessories, such as edge holders which hold the edges of the print medium to prevent the edges from rising during printing.

Figure 2:
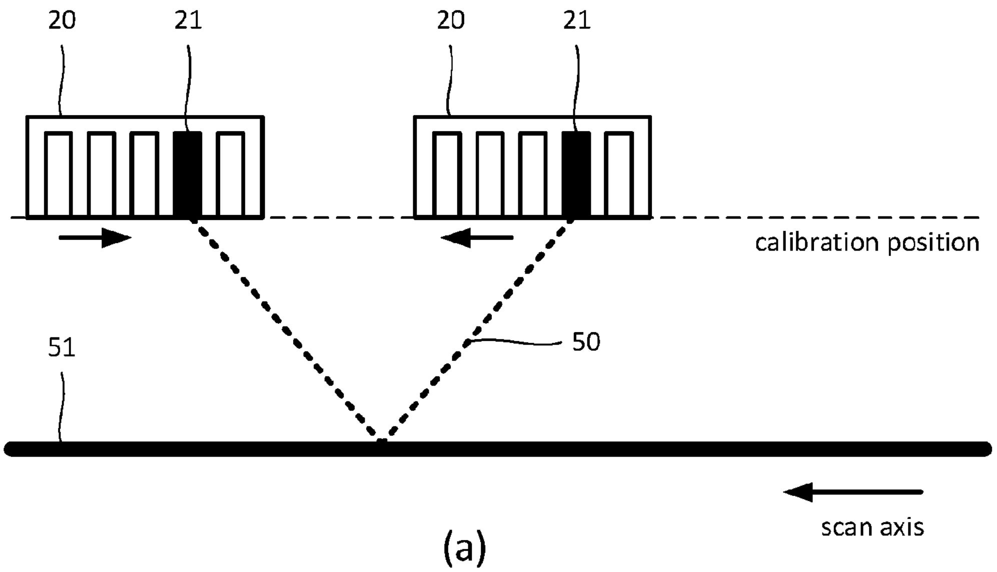
FIG. 2 shows the trajectory of drops fired from a nozzle of a printhead during forward and reverse travel, in which the printhead is at (a) a calibration position, and (b) a raised position.
Figure 2:
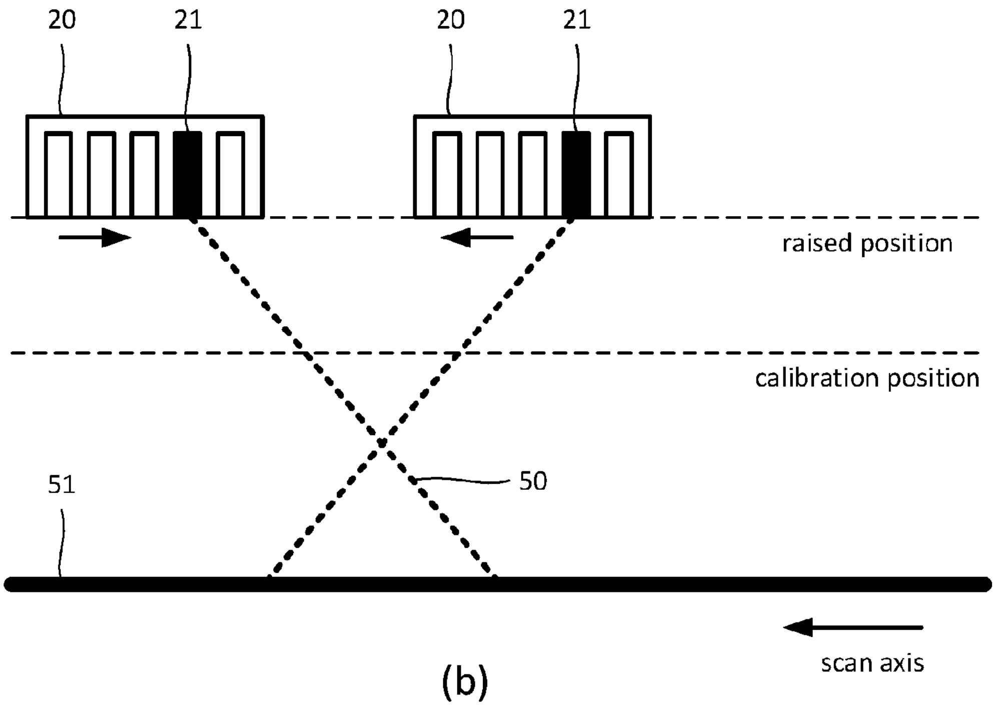

FIG. 2 shows the trajectory 50 of drops fired from a nozzle of a printhead 21 positioned at different heights. In FIG. 2(*a*), the printhead 21 is at the calibration position, i.e. the height at which the printheads 21 were calibrated. The nozzle of the printhead 21 is fired at times defined by the calibration alignment value. As a result, drops fired during forward travel of the printhead 21 are aligned with drops fired during reverse travel, i.e. the drops impact the print medium 51 at the same position. In FIG. 2(*b*), the position of printheads 21 has been raised. Again, the nozzle of the printhead 21 is fired at times defined by the calibration alignment value. However, the drops now have further to travel and therefore have a longer flight time. As already noted, the drops have a velocity component parallel to the scan axis. As a result of the longer flight time, the difference between the position at which a drop is fired and the position at which the drop impacts the print medium increases. Consequently, drops fired during forward travel of the printhead 21 are no longer aligned with drops fired during reverse travel.

As is evident from FIG. 2, when the height of a printhead 21 differs from the calibration height, the printhead 21 may no longer be aligned and thus the quality of the printed image may suffer. In order to mitigate this, the alignment module 37 determines an alignment value for each of the printheads 21.

Figure 3:
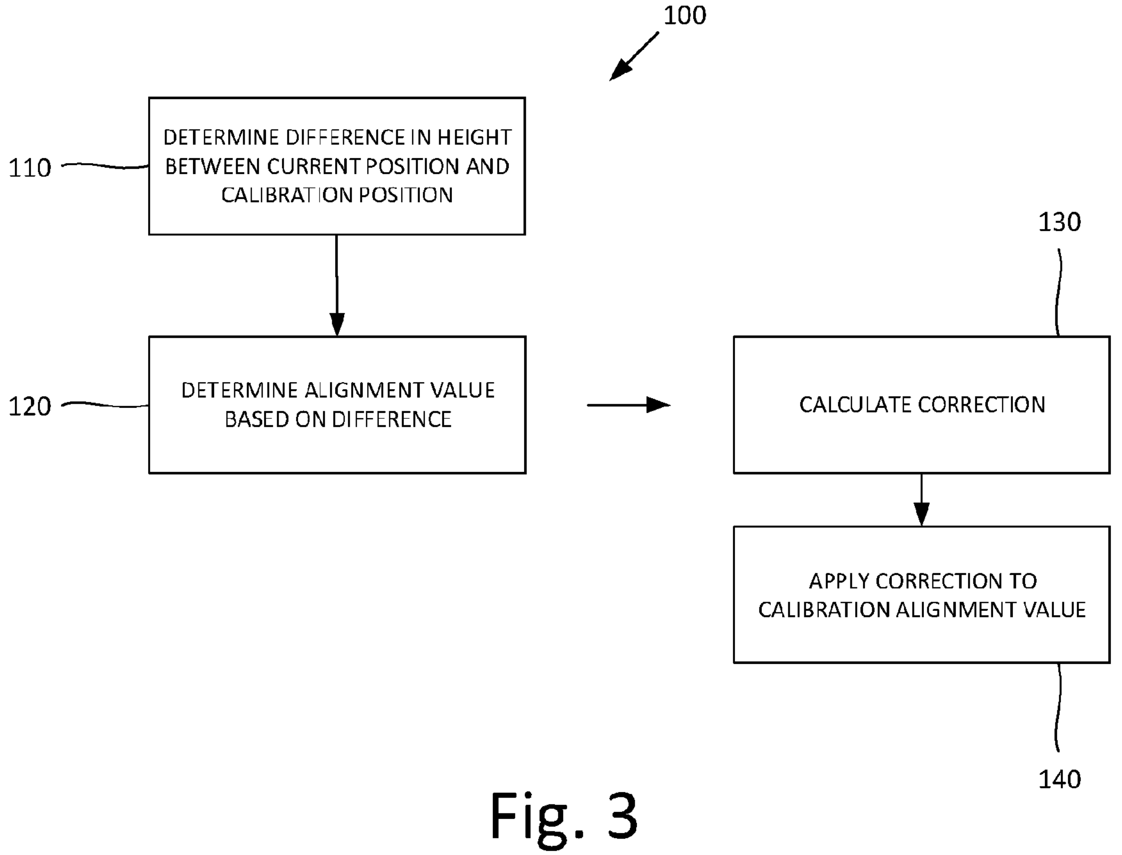
FIG. 3 shows an example method for determining an alignment value for a printhead.

FIG. 3 shows an example method that may be implemented by the alignment module 37.

The method 100 comprises determining 110 a difference in height between a current position of the printheads and the calibration position (i.e. the position at which the printheads were calibrated). In one example, the printer 10 may comprise a sensor for sensing the position of the printheads. In another example, an adjustment mechanism for adjusting the position of the printheads may include a gauge or other means to indicate the current position or change in position of the printheads. In a further example, the height of the printheads may be set to one of a discrete number of positions, such as low, normal and high. A user may then input the current position or change in position via a user interface (not shown).

Calibration may involve calibrating the printheads 21 at a specific position. Alternatively, the printheads 21 may be calibrated at any position. In this instance, the calibration position of the printheads 21 may be stored to the storage medium 32 along with the calibration alignment values 38. The method 100 may then use the stored calibration position in order to determine the difference in height.

The method 100 further comprises determining 120 an alignment value for each of the printheads 21 based on the difference. The alignment value is then used by the print module 36 to define the times at which the nozzles of the printhead 21 are fired during subsequent printing.

Determining 120 the alignment value for each of the printheads 21 may comprise calculating 130 a correction and then applying the correction 140 to the calibration alignment value 38 for that printhead.

The correction varies as a function of the difference in height between the current position and the calibration position of the printhead. The correction is zero when the difference is zero. Consequently, when the printheads 21 are at the calibration position, the alignment value corresponds to the calibration alignment value 38 for that printhead. The correction may have the same or opposite sign to that of the difference in height, depending on how the alignment value is used to define the times at which the nozzles are fired. For example, when the alignment value is zero, the print module 36 may apply an offset to the positions or times at which the nozzles are fired. The alignment value may then be used to either increase or decrease the offset. So, for example, the offset may have a minimum value when the alignment value is zero, and the alignment value may be used to increase the offset. Alternatively, the offset may have a maximum value when the alignment value is zero, and the alignment value may be used to decrease the offset. Irrespective of how the alignment value is used by the print module 36, the magnitude of the correction increases as the difference increases. A larger correction is therefore applied to the calibration alignment value in response to a larger difference in height between the current position and the calibration position.

The applicant has studied the behavior of the alignment value with printhead height for one particular type of printer. The study comprised calibrating the printheads at various different heights, i.e. printing a test pattern at each height and then determining an alignment value for each of the printheads. This process was then repeated for three different sample printers.

Figure 4:
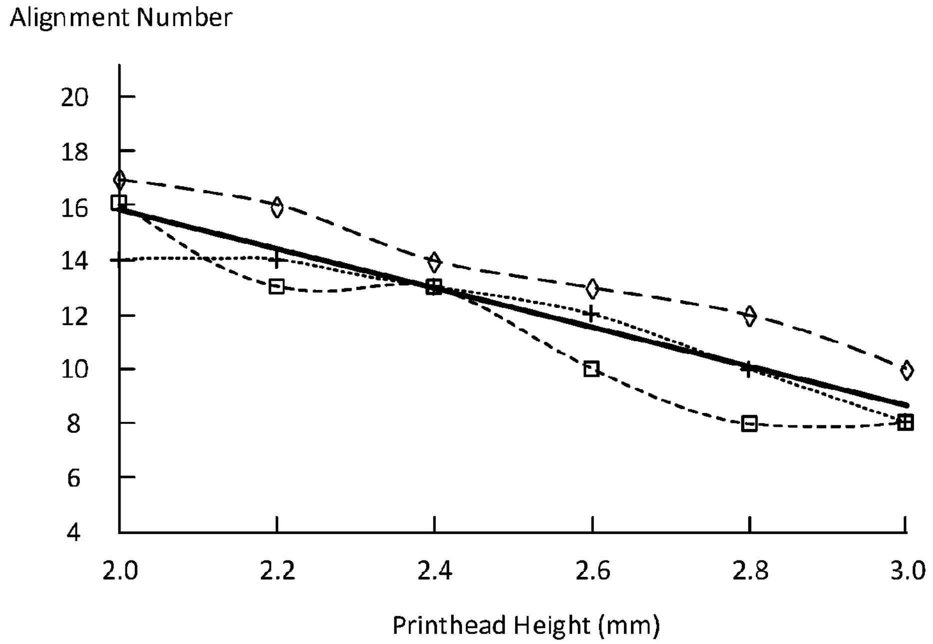
FIG. 4 shows the variation in alignment value with height for a printhead.

FIG. 4 shows the variation in the alignment value with printhead height for one of the printheads of the study. The variation in alignment value is shown for each of the three sample printers, along with a line of best fit. As is evident from FIG. 4, the alignment value was found to vary linearly with printhead height for this particular type of printer. Although FIG. 4 illustrates the behavior for just one printhead, the other printheads of the printer were found to have a similar behavior.

The alignment value for each of the printheads, A, may therefore be defined as: $A=A_{cal}+m\cdot\Delta h$, where $A_{cal}$ is the calibration alignment value, m is a scaling factor and Δh is the difference in height between the current position and the calibration position. The correction (m·Δh) is therefore the product of the difference (Δh) and the scaling factor (m). The scaling factor corresponds to the gradient of the line of best fit (i.e. the linear interpolation), which in the example of FIG. 4 is −7.10 units/mm. The negative scaling factor arises because, in this particular example, the alignment value is used to decrease the offset that is applied to the firing of the nozzles. Consequently, as the height of a printhead increases, the alignment value decreases, and a larger offset is applied to the firing signals.

During use of the printer 10, the speed of the carriage assembly 20, and thus the speed at which the printheads 21 move over the print medium, may change. For example, the printer 10 may have different print modes having different carriage speeds. By way of example, the printer 10 may have 'fast', 'normal' and 'best' print modes for which the carriage speeds are respectively 60, 50 and 40 ips (inches per second).

The trajectory of a drop fired from a nozzle depends not just on the height of the printhead, but also on the speed of the printhead, i.e. the carriage speed. For example, when the speed of the printhead increases, the velocity component of the drop in a direction parallel to the scan axis increases. As a result, the difference between the position at which a drop is fired and the position at which the drop impacts the print medium increases. The print module 36 therefore applies an offset to the firing of the nozzles that is defined by the alignment value and by the carriage speed. In addition, the applicant has found that, at least for the printer that was the subject of study, the alignment value depends not just on the height of the printhead but also on the speed of the printhead. Accordingly, the method 100 may determine 120 an alignment value for each of the printheads that depends on the difference in height and the speed of the printheads.

As noted above with reference to FIG. 4, for at least the printer that was the subject of study, the alignment value was found to vary linearly with printhead height. The alignment value, A, may therefore be defined as: $A=A_{cal}+m\cdot\Delta h$, where $A_{cal}$ is the calibration alignment value, m is a scaling factor and Δh is the difference in height between the current position and the calibration position. The applicant found that, at different carriage speeds, the alignment value continues to vary linearly with printhead height. However, the scaling factor (i.e. the gradient of the linear interpolated line) is different for different carriage speeds. The alignment value may therefore be defined as: $A=A_{ref}+m(s)\cdot\Delta h$, where m is a scaling factor that depends on the speed, s, of the printhead. The correction ($m(s)\cdot\Delta h$) applied to the calibration alignment value ($A_{cal}$) therefore varies as a function of both the difference in height ($\Delta h$) and the speed (s) of the printhead. Moreover, for at least the studied printer, the correction may be defined as the product of the difference in height ($\Delta h$) and a scaling factor (m), where the scaling factor (m) depends on a speed (s) of the printhead.

The storage medium 32 may store a scaling factor for each of the different printhead speeds (i.e. each of the different carriage speeds), and the alignment module 37 may select a scaling factor based on the current speed of the printhead 21. This then provides a relatively simple way to calculate the scaling factor as a function of speed, particularly for a printer for which the carriage speed is one of a discrete set of values, e.g. 40, 50 and 60 ips. Nevertheless, the alignment module 37 may determine the scaling factor in other ways. For example, the alignment module may calculate the scaling factor based on the speed by means of a mathematical function or equation.

With the method described above, alignment of the printheads may be maintained at different heights without having to recalibrate the printheads. As a result, the printheads may be moved and image quality may be maintained without any downtime in printing. Additionally, the printing materials used for recalibration (e.g. print medium and printing fluids) may be spared.

For the printer that was the subject of study, the alignment value was observed to vary linearly with printhead height. The correction applied to the calibration alignment value may therefore be defined as the product of the difference in height and a scaling factor. For other types of printer, the function that describes the relationship between the alignment value and the printhead height may be non-linear. Accordingly, in a more general sense, the correction may be said to be a function of the difference in height, which may be expressed as a polynomial of any non-zero order.

In the example method described above, a different correction is applied to the calibration alignment value for each printhead. Whilst the calibration alignment value for one printhead may differ markedly from that of another printhead, the change in alignment value with printhead height may differ very little from one printhead to the next. Accordingly, rather than calculating a correction that is unique to each printhead, a single, common correction may be applied to each of the calibration alignment values. For example, with the printer that was the subject of study, the scaling factors (i.e. the gradient of the interpolated line of FIG. 4) for the printheads were found to lie in the range −6.24 to −7.90 units/mm, when printing at a carriage speed of 55 ips. Accordingly, rather than calculating a correction that is unique to each printhead, a single, common correction may be calculated based on a scaling factor of, say, −7.07 units/mm.

Some of the printheads 21 of the printer 10 of FIG. 1 are responsible for firing different types of printing fluid. For example, each of the printheads responsible for firing a colorant comprises dies on the left-hand side through which a first printing fluid is fired (e.g. light magenta, yellow and cyan) and dies on the right-hand side through which a second printing fluid is fired (e.g. light cyan, magenta and black). Owing to differences in how the different printing fluids behave, different calibration alignment values and/or corrections may used for each of the printing fluids. Accordingly, the alignment module 37 may determine multiple alignment values for a single printhead.

Tolerances in the dies 23 of a printhead 21 may lead to a slight misalignment of drops. Accordingly, each of the dies may have a different calibration alignment value. For dies of the printhead 21 that fire the same printing fluid, the same correction may be applied to each of the calibration alignment values.

Although the printer 10 described above comprises a plurality of printheads 21, the example methods described above may equally be applied to a printer having a single printhead.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method comprising:

determining a difference in height between a current position and a calibration position of a printhead of a printer; and determining an alignment value for the printhead based on the difference.

2. A method as claimed in claim 1, wherein determining the alignment value comprises calculating a correction based on the difference and applying the correction to a calibration alignment value.

3. A method as claimed in claim 2, wherein the correction is calculated as a function of the difference.

4. A method as claimed in claim 2, wherein the correction is calculated as a function of a speed of the printhead.

5. A method as claimed in claim 2, wherein the correction is calculated as a product of the difference and a scaling factor, and the scaling factor depends on a speed of the printhead.

6. A method as claimed in claim 5, wherein the method comprises storing a plurality of scaling factors for a plurality of different speeds, and selecting a scaling factor based on the speed of the printhead.

7. A method as claimed in claim 2, wherein the method comprises calibrating the printhead at the calibration position, and calibrating the printhead comprises printing a test pattern onto a print medium and determining the calibration alignment value based on alignment of features within the test pattern.

8. A method as claimed in claim 1, wherein the method comprises determining alignment values for a plurality of printheads based on the difference.

9. A method as claimed in claim 8, wherein the method comprises storing a calibration alignment value for each of the printheads, and determining the alignment value comprises calculating a correction for each of the printheads based on the difference and applying the correction to a respective calibration alignment value.

10. A method as claimed in claim 1, wherein the method comprises firing nozzles of the printhead at times defined by the alignment value.

11. A printer comprising:

a printhead having nozzles through which drops of a printing fluid may be fired;

a processor; and a storage medium storing instructions for execution by the processor, the instructions, when executed by the processor, causing the processor to:

determine an alignment value for the printhead based on a difference in height between a current position and a calibration position of the printhead; and generate signals to fire nozzles of the printhead at times defined by the alignment value.

12. A printer as claimed in claim 11, wherein the storage medium stores a calibration alignment value, and the instructions, when executed by the processor, cause the processor to calculate a correction based on the difference and apply the correction to the calibration alignment value to determine the alignment value.

13. A printer as claimed in claim 11, wherein the printer comprises a plurality of printheads, and the instructions, when executed by the processor, cause the processor to determine an alignment value for each of the printheads based on the difference, and to generate signals to fire nozzles of each of the printheads at times defined by the respective alignment value.

14. A non-transitory storage medium storing instructions that, when executed by a processor of a printer, cause the processor to:

determine an alignment value based on a difference in height between a current position and a calibration position of a printhead of the printer; and generate signals to fire nozzles of the printhead at times defined by the alignment value.

* * * * *